United States Patent [19]

Horie et al.

[11] 4,414,433

[45] Nov. 8, 1983

[54] MICROPHONE OUTPUT TRANSMISSION CIRCUIT

[75] Inventors: Masao Horie, Tachikawa; Yusuke Sunada, Sumiyoshi; Junta Inari, Tokyo, all of Japan

[73] Assignee: Sony Corporation, Tokyo, Japan

[21] Appl. No.: 274,261

[22] Filed: Jun. 16, 1981

[30] Foreign Application Priority Data

Jun. 20, 1980 [JP] Japan ..................................... 55-84271

[51] Int. Cl.[3] .............................................. H01M 1/60

[52] U.S. Cl. .................................... 179/70; 179/81 B; 381/92; 381/113

[58] Field of Search ............... 179/10 M, 81 B, 2 BC, 179/70, 77, 1 VC, 1 F, 1 E, 1 P, 1 A

[56] References Cited

U.S. PATENT DOCUMENTS 3,899,613 8/1975 Tabalba ............................ 179/81 B
4,002,852 1/1977 Martin ............................... 179/81 B
4,007,335 2/1977 Hetherington et al. ....... 179/16 AA
4,088,813 5/1978 Rogers et al. ......................... 179/70

FOREIGN PATENT DOCUMENTS 2913115 10/1979 Fed. Rep. of Germany .... 179/81 B
54-151308 11/1979 Japan .................................... 179/70
54-151309 11/1979 Japan .................................... 179/70

*Primary Examiner*—G. Z. Rubinson
*Assistant Examiner*—Robert Lev
*Attorney, Agent, or Firm*—Lewis H. Eslinger; Alvin Sinderbrand

[57] ABSTRACT

A microphone output transmission circuit for a capacitive microphone such as an electret microphone employs a differential amplifier to provide a transformerless balanced connection to a microphone transmission line, either at the transmission end or at the reception end thereof. Power is applied in a phantom connection by superimposing a DC voltage on two balanced signal conductors of the transmission line, and using the shield thereof as a ground return line. A pair of microphones with oppositely-directed sound-gathering planes can be connected to respective inputs of a differential amplifier at the transmission end, so that the two microphones together have a bidirectional characteristic.

10 Claims, 6 Drawing Figures

MICROPHONE OUTPUT TRANSMISSION CIRCUIT

BACKGROUND OF THE INVENTION

1. Field of the Invention

The present invention relates to a microphone output transmission circuit, and particularly relates to such a circuit which is suitable for use with a capacitive, or condenser microphone of the electret type or the bias type.

2. Brief Description of the Prior Art

The bias-type condenser microphone requires a DC bias voltage applied between its diaphragm and its fixed electrode. The electret condenser microphone, while not needing a bias voltage, still employs an FET preamplifier which, in turn requires a power source. Therefore, in either case it is necessary for the transmission cable for the output signal of a condenser microphone to provide both signal lines and power lines. It is conventional to arrange the signal lines and power lines in common in order to minimize the number of conductors required.

One conventional arrangement of a transmission circuit for a capacitive microphone generally employs an FET preamplifier coupled to the capacitive microphone and to the primary winding of an audio transformer. The secondary winding of the transformer provides the audio signal as a balanced signal to a balanced pair of conductors. A phantom powering system can be employed in which DC power is superimposed on both balanced conductors, and is derived at a center tap of the transformer secondary to power the FET preamplifier. A ground return is then provided, for example, by a braided shield surrounding the balanced conductors. Because this arrangement requires transformers for signal transmission, the signal quality is easily degraded. More particularly, the frequency response of a transformer is limited, and is further degraded by the presence of a DC current in the secondary windings.

An alternative conventional arrangement avoids the problem caused by DC current in the windings by employing a DC shunt formed of two equal-value resistors connected in series between the secondary terminals, and by deriving the DC power from the junction of the resistors, rather than from the secondary winding center tap. However, in this arrangement the resistors also shunt the signal as well as the DC power, which can result is unacceptable signal-power attenuation.

OBJECTS AND SUMMARY OF THE INVENTION

Accordingly, it is an object of this invention to provide a microphone output transmission circuit which avoids the deficiencies of the above-mentioned conventional arrangements.

It is another object to provide a microphone output transmission circuit which employs a transmission path, formed of a balanced pair of conductors and a ground path, to conduct audio signals from the microphone and to provide DC current to an amplifier associated with the microphone, while avoiding the necessity of employing an audio transformer.

It is an additional object to provide a transmission circuit suitable for use with a pair of capacitive microphones, so that the pair can jointly exhibit a bidirectional response.

According to an aspect of this invention, a microphone output transmission circuit comprises a capacitive microphone, a balanced transmission path formed of a balanced pair of conductors and a ground path, a transmission arrangement coupling the microphone with an input side of the balanced transmission path and amplifying the microphone output and providing the amplified microphone output as a balanced signal to the balanced pair of conductors, a DC power source superimposing DC power for the transmission arrangement between the ground path and the balanced pair, and a reception arrangement at a reception end of the transmission path remote from the transmission end thereof for deriving a received output signal and providing the same to an output terminal. At least one of the transmission arrangement and the reception arrangement comprises a differential amplifier coupled in a transformerless connection between the respective end of the transmission path and the respective one of the microphone and the output terminal. In either case, the DC power superimposed on the transmission path is applied to power the differential amplifier.

Favorably, the differential amplifier is disposed in the transmission arrangement, and has two inputs to which respective capacitive microphones are coupled. The microphones, then can be arranged with their respective diaphragms, or sound-gathering planes thereof, facing outwardly, thereby giving the two microphones together a bidirectional response.

These and other objects, features, and advantages of this invention will become apparent from the ensuing description of several embodiments of the invention, which is to be read in conjunction with the accompanying drawings.

DETAILED DESCRIPTION OF THE PREFERRED EMBODIMENTS

Figure 1:
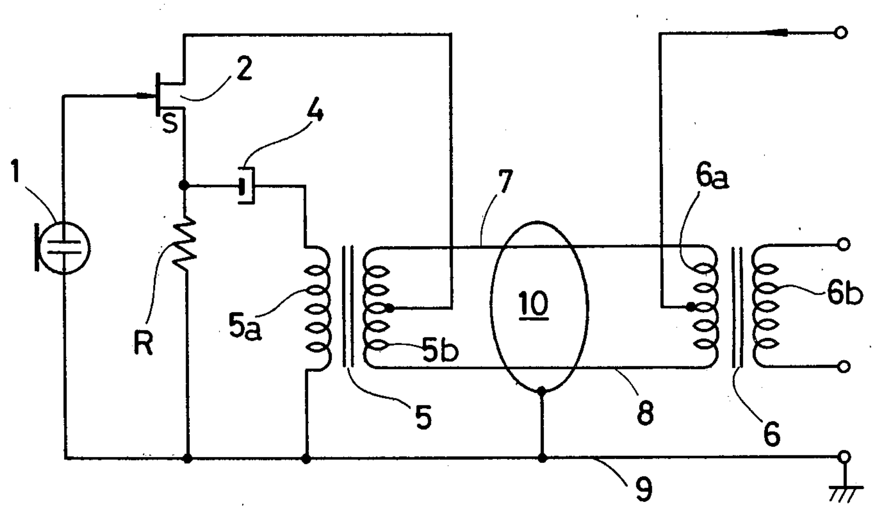
FIG. 1 PRIOR ART
FIGS. 1 and 2 are schematic diagrams showing conventional microphone output transmission circuits.
Figure 2:
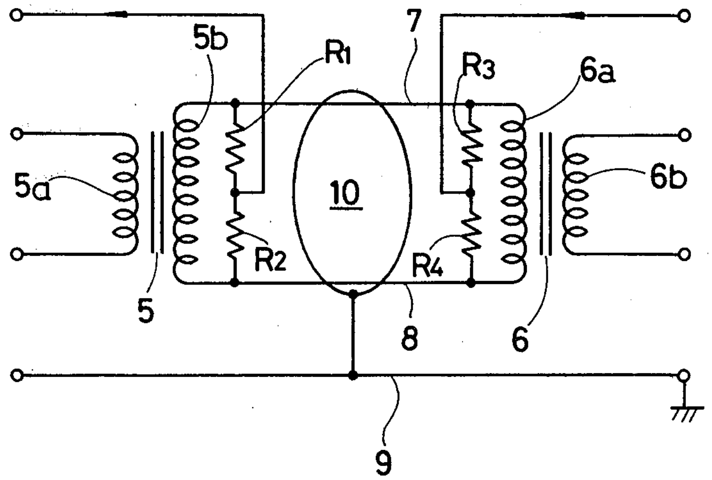
FIG. 2 PRIOR ART

By way of background and for contrasting the advantages of this invention, conventional microphone output transmission circuits are illustrated in FIGS. 1 and 2.

FIG. 1 shows a conventional microphone output transmission circuit, in which the output of an electret microphone 1 is delivered through a source follower consisting of a field effect transistor or FET 2 and a resistor R, and thence through a capacitor 4 to a primary winding **5*a* of a transformer 5. The latter's secondary winding 5*b* then provides an audio output signal through balanced conductors 7 and 8 of a shielded microphone cable 10 to a primary winding 6*a* of a transformer 6 at the remote, or reception end. A secondary winding 6*b* of the transformer 6 provides the audio output signal. The microphone cable 10 has a grounded shield conductor 9** providing ground at both the transmission and reception end.

Power for the FET 2 is supplied from the center tap of the primary winding *6a* of the transformer 6, through the lines 7 and 8, then through the center tap of the secondary winding *5b* of the transfomer 5 to the drain of the FET 2. The conductors 7 and 8 in the microphone cable 10 have substantially the same DC potential relative to the shield conductor 9. Consequently, a signal transmitted from the transformer 5 through the lines 7 and 8 has a balanced signal form (i.e., is a differential signal). In other words, an increase of the audio signal amplitude in the conductor 7 relative to ground potential is accompanied by a corresponding decrease of the signal amplitude in the conductor 8. Accordingly, the secondary winding *6b* of the transformer 6 at the reception end provides the transmitted signal component only, and any common-mode noise component, such as hum superimposed on both conductors 7 and 8, will be cancelled out. This transmission arrangement is called a phantom powering system.

The system of FIG. 1 has the disadvantage of necessitating transfomers for signal transmission and, furthermore, the frequency response of the transformers can be degraded due to the presence of DC current on their windings.

FIG. 2 shows another conventional microphone output transmission circuit which was designed to avoid the foregoing problem in that DC current from the power source does not flow through the transformer windings, but rather flows through a DC shunt consisting of resistors R3 and R4, conductors 7 and 8, and a DC shunt consisting of resistors R1 and R2. In this arrangement, the DC current does not flow through the transformer windings, provided that resistors R1 and R2 are of equal value and resistors R3 and R4 are also of equal value. However, the resistors R1–R4 also shunt the audio signal, thereby causing a power loss and a reduction of the signal level.

The present invention provides a microphone output transmission circuit which eliminates all of the above-mentioned deficiencies. Embodiments of the invention will now be described with reference to the accompanying drawings.

Figure 3:
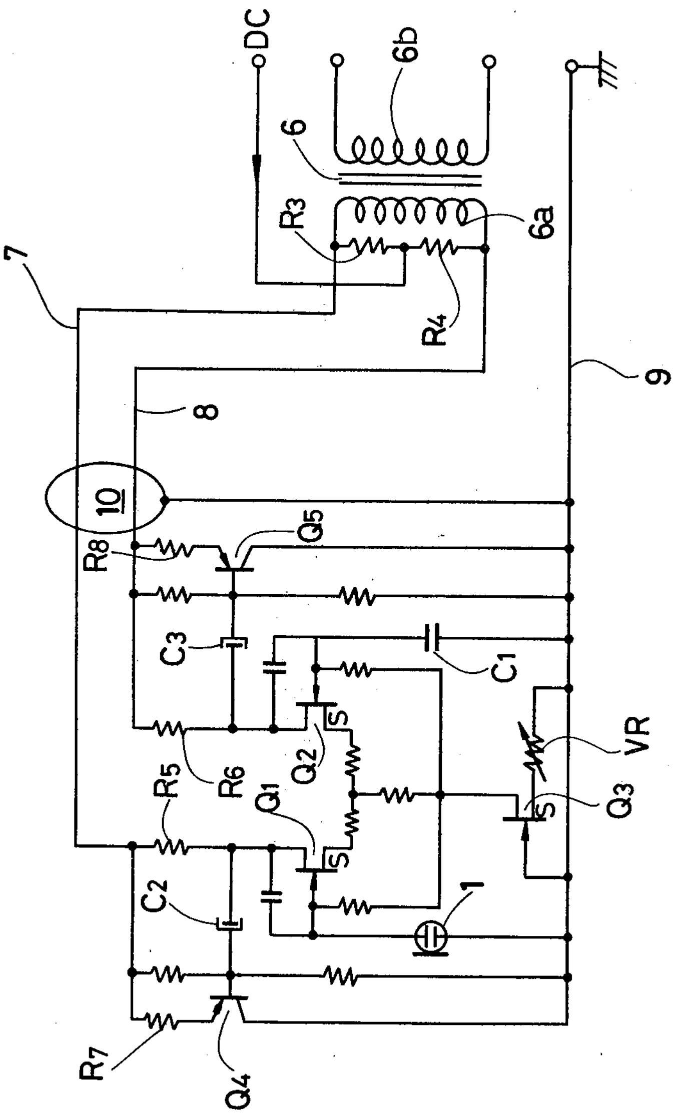
FIG. 3 is a schematic diagram showing the microphone output transmission circuit of a first embodiment of the present invention.
Figure 4:
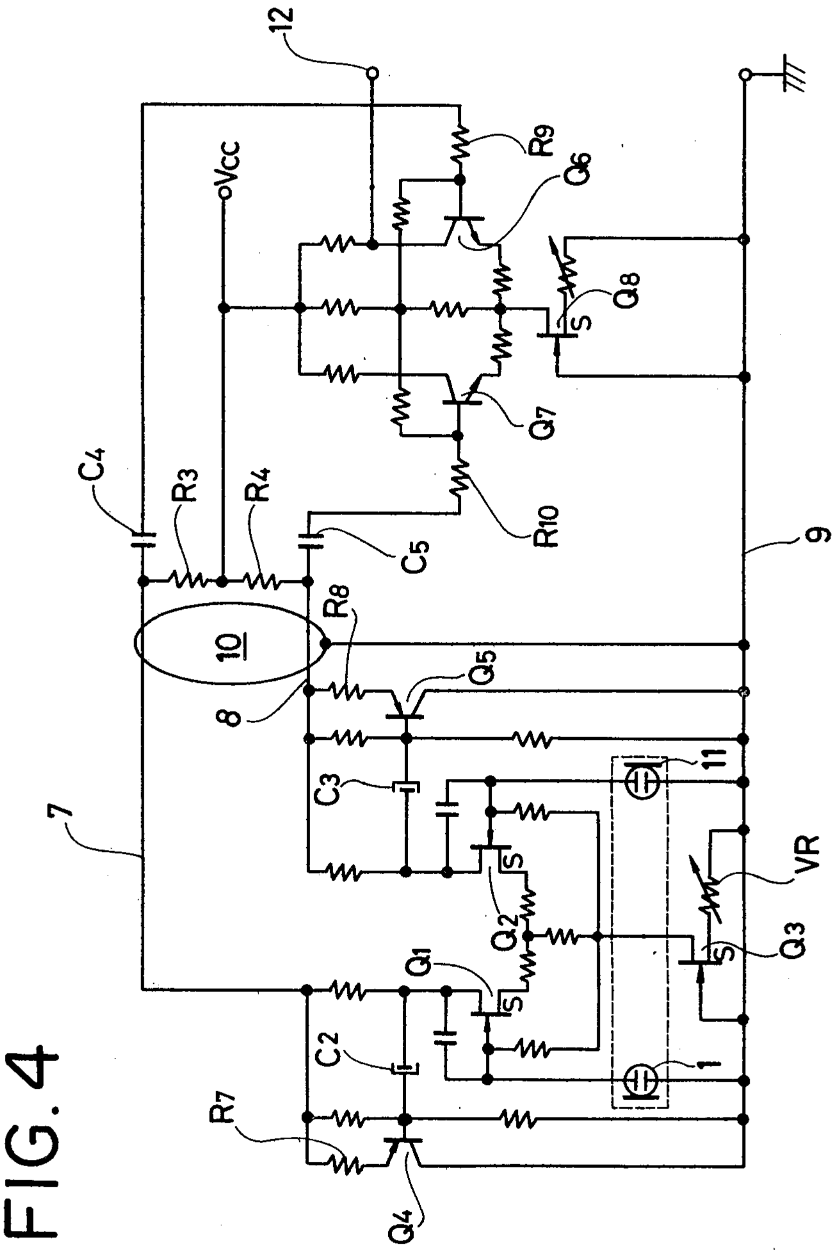
FIG. 4 is a schematic diagram showing a second embodiment of the invention.
Figure 6:
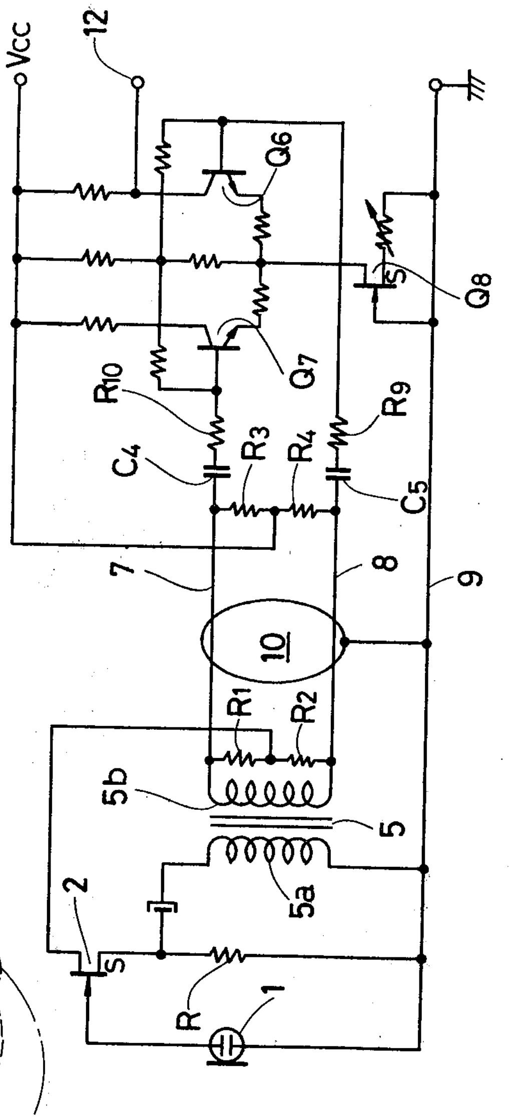
FIG. 6 is a schematic diagram showing a third embodiment of the invention.

In each of the embodiments of FIGS. 3, 4, and 6, elements in common with the arrangements of FIGS. 1 and 2 will be identified with the same reference characters, and a detailed description thereof will be omitted. Other elements will be described in detail only with the embodiment in which they are first introduced.

FIG. 3 shows a first embodiment of the invention, in which the output of an electret microphone 1 is delivered to the gate of a field effect transistor (FET) Q1 which, in conjunction with another FET Q2, consists a differential amplifier. A capacitor C1 is connected between the gate of the transistor Q2 and the ground conductor 9 so as to bypass AC current on the gate thereof to ground. The drains of the transistors Q1 and Q2 are connected to load resistors R5 and R6, respectively, the opposite ends of which are supplied with DC power voltages through resistors R3 and R4 at the reception end of a microphone cable 10 and conductors 7 and 8 as in the cases of FIGS. 1 and 2. An FET Q3 coupled to the common source circuit of the transistors Q1 and Q2 serves as a constant current source for the differential amplifier, the gain thereof being adjusted by selecting the setting of a variable resistor VR bridging the source of the transistor Q3 and the ground conductor 9.

The output signals from the drains of the transistors Q1 and Q2 are also supplied through capacitors C2 and C3 to the bases of PNP transistors Q4 and Q5, respectively. The emitters of the transistors Q4 and Q5 are connected by small-value resistors R7 and R8 to the conductors 7 and 8, respectively, so that a pair of emitter followers are constituted by the resistors R7 and R8, and the transistors Q4 and Q5. The output signal of the differential amplifier is sent through the emitter followers and balanced conductors 7 and 8 to the primary winding *6a* of the transformer 6 at the reception end. Accordingly, the signal currents flowing on the conductors 7 and 8 have a balancing relationship so that an increase of one results in a decrease of the other, and an external common-mode noise component superimposed on the lines 7 and 8 does not appear on the output of the transformer 6.

Moreover, the signal source impedance as seen from the balanced conductors 7 and 8 can be reduced to a nominal impedance of 600Ω, for example, owing to the emitter followers at the transmission end of the microphone cable 10, thereby providing a noise immunity against hum and buzz for the microphone cable 10. Accordingly, the latter can have a length up to 100 meters.

Similarly to the arrangement of FIG. 2, the DC power is provided through the equal-value resistors R3 and R4 disposed across the primary winding *6a* of the transformer 6.

The resistors R3 and R4 at the reception end of the cable 10 serve to block the DC current on the primary winding *6a* of the transformer 6 by evenly dividing the power voltage, and also serve as load resistors for the emitter follower transistors Q4 and Q5. This feature differs the function of the resistors R3 and R4 from the corresponding shunt resistors R3 and R4 in the FIG. 2 conventional arrangement, which cause a loss in the transmission signal level and in the power voltage.

In the embodiment shown in FIG. 3, the need for a transformer is obviated at the transmission end of the microphone cable 10, thus further avoiding deficiencies such as deterioration of the frequency response of the transformers and loss of power and of signal level as mentioned above. Consequently, deterioration of transmission characteristics and reduction of transmission efficiency for the microphone output can be significantly reduced.

FIG. 4 shows a second embodiment of the present invention. In this embodiment, the transformer 6 at the reception end of the microphone cable 10 in FIG. 3 is also replaced with a differential amplifier. The audio signals transmitted over balanced conductors 7 and 8 are supplied to the bases of transistors Q6 and Q7 through DC blocking capacitors C4 and C5, and resistors R9 and R10 respectively. The transistors Q6 and Q7 constitute a differential amplifier, and their emitters are coupled together to the drain of an FET Q8 which serves as a constant current source. The audio output signal is provided from the transistor Q6 of the differential amplifier to a terminal 12. The differential amplifier at the transmission end is supplied with the DC power through the resistors R3 and R4, and thence through the conductors 7 and 8. In this embodiment, no transformers are used at either the transmission or the reception end of the microphone cable 10, and therefore this embodiment avoids any deterioration of transmission characteristics for the microphone output and also avoids reduction of power efficiency that might otherwise ensue.

Figure 5:
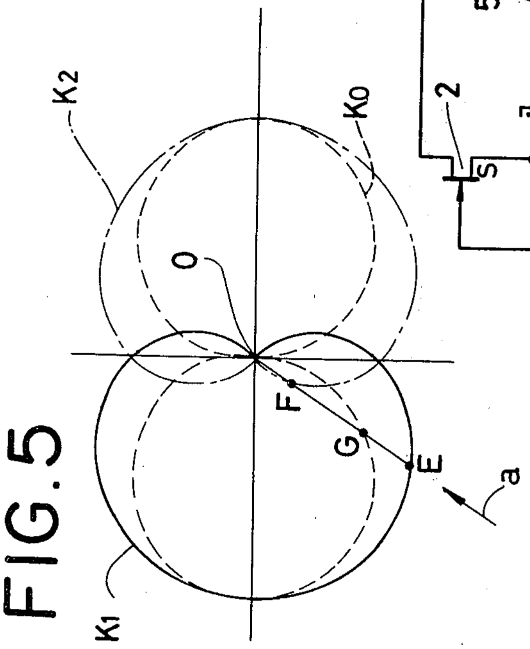
FIG. 5 is a response chart showing the bidirectional characteristic obtained by the microphone output transmission circuit of FIG. 4.

In the arrangement of FIG. 4, a pair of capacitor microphones 1 and 11 are connected to two respective inputs of the differential amplifier (i.e., the gates of the transistors Q1 and Q2) at the transmission end of the cable 10. These microphones 1 and 11 are favorably formed as an integrated microphone unit with their sound collecting planes facing outwardly, and each has a unidirectional response as shown by the solid curve $K_1$ of FIG. 5 and the dot-and-dash curve $K_2$ thereof, respectively. The outputs of the microphones 1 and 11 are subjected to subtraction by the differential amplifier comprising the transistors Q1 and Q2 before they are transmitted over the conductors 7 and 8, and thus the audio signal from the differential amplifier at the reception end of the cable 10 exhibits a bidirectional characteristic as shown by the dotted curve $K_0$ in FIG. 5. For example, when the microphone unit receives an acoustic input in the direction a in FIG. 5, the microphone 1 produces an output with an amplitude corresponding to the length $\overline{OE}$ on the diagram, and the microphone 11 produces an output with an amplitude corresponding to the length $\overline{OF}$. Since the difference of these outputs is produced on the output of the differential amplifier comprising the transistors Q1 and Q2, the audio signal from the ouput terminal 12 in FIG. 4 has an amplitude corresponding to the length $\overline{OG}$ in FIG. 5. The locus of all such points G is then the bidirectional response curve, as exemplified by the dotted curve $K_0$ in FIG. 5.

FIG. 6 shows a third embodiment of the invention, in which a differential amplifier is used only at the reception end of the cable 10. At the transmission end of the cable 10, there is employed an impedance converter consisting of a source follower transistor 2, a coupling capacitor 4, and a transformer 5, as in the conventional arrangement shown in FIG. 2.

In the foregoing embodiments, an electret capacitor microphone is used; however, a bias-type condenser microphone may also be used, with only slight modifications to the circuitry.

As described above, the arrangement according to the present invention comprises one or more differential amplifiers provided at one or both of the transmission end and reception end of a cable having a ground line and two transmission conductors for transmitting and/or receiving the balanced output in response to the microphone output, and the two transmission conductors are each provided with a superimposed DC voltage of the same potential relative to the ground line, so that power is supplied from the reception end to the transmission end. Consequently, a transformerless circuit can be provided for at least one of the transmission and reception ends. Because the audio transformers for transmitting and/or receiving the balanced output can be replaced with a differential amplifier, the frequency response of the overall system is enhanced, while the consumption of power is reduced.

Moreover, even though the transformers are replaced with differential amplifiers, a balanced output signal can be transmitted through a pair of balanced transmission conductors, so that any common-mode external noise superimposed on the transmission lines does not mix with the transmitted signal. Consequently, where an embodiment of this invention is employed, an exceptionally high quality signal transmission can be achieved.

Although several illustrated embodiments of this invention have been described in detail hereinabove with reference to the accompanying drawings, it is to be understood that the invention is not limited to those embodiments, and that many modifications and variations can be effected therein by one skilled in the art without departing from the scope and spirit of the invention as defined in the appended claims.

We claim:

1. In combination with a capacitive microphone providing a microphone output; a microphone output transmission circuit comprising a microphone cable including a pair of transmission lines and a ground line extending between transmission and reception ends of said cable, first coupling means connecting said microphone with said pair of transmission lines, at said transmission end, and being operative to apply said microphone output as a balanced signal to said pair of transmission lines, a source of DC power, received output means, and second coupling means connecting said pair of transmission lines, at said reception end, with said DC power source so as to impose substantially the same DC potential on said pair of transmission lines relative to said ground line, and with said received output means for providing a received output signal at the latter in response to said balanced signal on said transmission lines, at least one of said first and second coupling means including differential amplifier means powered by said DC power source and coupled in a transformerless connection between the respective end of said cable and said microphone or received output means, respectively.

2. The combination according to claim 1; in which said differential amplifier means is part of said first coupling means and includes first input means connected to said microphone, second input means, means through which said second input means is connected with ground, and first and second signal output means connected with said transmission lines, respectively, at said transmission end.

3. The combination according to claim 2; in which said means through which the second input means is connected with ground includes a by-pass capacitor.

4. The combination according to claim 2; in which said means through which the second input means is connected with ground includes another capacitive microphone.

5. The combination according to claim 4; in which the first-mentioned microphone and said other microphone have substantially similar unidirectional characteristic patterns and are arranged relative to each other with said patterns opposed to provide a bi-directional balanced output at said first and second signal output means of the differential amplifier means.

6. The combination according to claim 2; in which said differential amplifier means includes first and second amplifying elements having respective input electrodes connected with said first and second input means, respectively, and respective output electrodes connected through said first and second signal output means to said transmission lines, respectively.

7. The combination according to claim 6; in which said differential amplifier means further includes a current source common to both of said amplifying elements for regulating current flows therethrough; and said first and second signal output means include first and second current amplifiers having input electrodes coupled to said output electrodes of the first and second amplifying elements, respectively, said first and second current amplifiers further having respective output current electrodes, said first and second resistors connecting said output current electrodes of the first and second current amplifiers to said transmission lines, respectively.

8. The combination according to claim 1; in which said differential amplifier means is part of said second coupling means and includes first and second signal input means connected with said transmission lines, respectively, at said reception end, signal output means connected with said received output means, and power input means connecting said DC power source with said differential amplifier means and with transmission lines.

9. The combination according to claim 8; in which another differential amplifier means is part of said first coupling means and includes first input means connected to said microphone, second input means, means through which said second input means of said other differential amplifier means is connected to ground, and first and second signal output means connected with said transmission lines at said transmission end.

10. The combination according to claim 9; in which said means through which second input means of the other differential amplifier means is connected with ground includes another capacitive microphone, and the first-mentioned microphone and said other microphone have similar unidirectional characteristic patterns and are arranged relative to each other with said patterns opposed to provide a bi-directional balanced output at said first and second signal output means of said other differential amplifier means.

* * * * *